United States Patent [19]

Hutton

[11] Patent Number: 5,118,073
[45] Date of Patent: Jun. 2, 1992

[54] VALVE

[75] Inventor: Peter Hutton, Calgary, Canada

[73] Assignee: Century Valve, Ltd., Calgary, Canada

[21] Appl. No.: 757,962

[22] Filed: Sep. 12, 1991

[51] Int. Cl.$^5$ .................... F16K 25/00; F16K 31/50
[52] U.S. Cl. ........................... 251/88; 137/315;
    251/229; 251/264; 251/274; 251/327; 403/353
[58] Field of Search .............. 137/315; 251/84, 86,
    251/88, 214, 228, 223, 225, 229, 264, 265, 273,
    274, 309, 327, 328, 329; 403/353, 360, 361

[56] References Cited

U.S. PATENT DOCUMENTS

| | | | |
|---|---|---|---|
| 534,507 | 2/1895 | Hoagland | 403/353 |
| 679,051 | 7/1901 | Hewlett | 251/265 |
| 1,092,035 | 3/1914 | Froehlich | |
| 2,059,991 | 11/1936 | Goehring | |
| 2,388,046 | 10/1945 | Emrich | |
| 2,457,472 | 12/1948 | Hufferd et al. | |
| 2,504,057 | 4/1950 | Trefil | |
| 3,032,310 | 5/1962 | Hansen | 251/327 |
| 3,512,753 | 5/1970 | Weise | 251/327 |
| 3,529,805 | 9/1970 | Callahan, Jr. et al. | 251/264 |
| 3,761,052 | 9/1973 | Tobbe et al. | 251/88 |
| 3,761,053 | 9/1973 | Bedo et al. | 251/88 |
| 4,114,851 | 9/1978 | Shivak et al. | 251/88 |
| 4,270,727 | 6/1981 | Norman | |
| 4,658,848 | 4/1987 | Meyer et al. | 251/327 |

FOREIGN PATENT DOCUMENTS

| | | | |
|---|---|---|---|
| 964254 | 3/1975 | Canada . | |
| 246670 | 10/1987 | Czechoslovakia . | |
| 717535 | 2/1942 | Fed. Rep. of Germany | 403/353 |
| 2305668 | 5/1984 | Fed. Rep. of Germany . | |
| 635574 | 3/1928 | France | 251/327 |
| 2300945 | 9/1976 | France | 251/88 |
| 655162 | 3/1986 | Switzerland . | |
| 836076 | 6/1960 | United Kingdom . | |
| 1393530 | 5/1975 | United Kingdom . | |

Primary Examiner—George L. Walton
Attorney, Agent, or Firm—Watson, Cole, Grindle & Watson

[57] ABSTRACT

A plug valve is disclosed which has a radially outwardly directed projection at the end of the valve stem, the projection being received in a complementary cylindric chamber in the plug of the valve for easy exchange of the plug during maintenance of the valve. The plug is freely rotatable relative to the stem of the valve. In the preferred embodiment, the stem of the valve does not rotate during the opening or closing motion. The invention provides a simplified structure, improves reliability of the valve and the simplicity of exchange of the plug in maintenance.

8 Claims, 3 Drawing Sheets

VALVE

The present invention relates to the valves and in particular to high pressure, high temperature plug valves.

Some known plug valves of this kind typically comprise the arrangement of plugs which are integral with the stem. Such valves are known to suffer from high wear at the valve seat and at the packing of the valve stem, as well as difficulties with centering the plug relative to the seat. The replacement of the plug, which may be often required, presents an expensive maintenance item as the entire stem has to be replaced.

It is also known to provide flow plugger valve (e.g. Canadian Patent 964,254 issued Mar. 11, 1975) in which the plug is rotatable relative to the stem so that, on opening or closing of the valve, the plug merely moves in axial direction and does not rotate. This reduces the galling of the valve seat. The rotatable securement of the plug to the stem is also associated with certain play at the coupling between the stem and the plug which presents the advantage that the plug has the capability of self-aligning with the axis of the seat on closing of the passage with the result that the closing of the valve is more accurate and leak-free.

While the latter structure of valves presents an improvement over the former several disadvantages are still encountered. For instance, the securement of the valve stem to the plug provides unwanted passage for pressurized fluid which allows the leakage of pressurized fluid even when the valve is in a fully open position, subjecting the packing assembly of the valve stem to undue pressure. Also, the coupling between the stem and the plug in the known devices is relatively complex in structure.

It is an object of the present invention to further advance the art of high pressure plug valves of the kind referred to at the outset.

In general terms, the present invention provides a valve which comprises in combination:
a) a body which has a longitudinally disposed fluid passage, and a laterally inwardly directed, generally cylindrical valve chamber coaxial with a valve axis, said valve chamber reaching into said passage and defining therein hollow, conical plug seat means, coaxial with said axis;
b) conical plug means complementary with said seat means and disposed in said valve chamber coaxially therewith;
c) said plug means being rotatably secured to a first end portion of a valve stem for axial displacement in common therewith, said stem being coaxial with said axis and further including an elongate, cylindric intermediate portion and a second end portion;
d) said stem being mounted in a housing fixedly secured to the body and sealingly communicating with said valve chamber;
e) stem displacement means operatively associated with the stem and with the housing for selective displacement of the stem relative to the housing to displace the plug means in and out of the housing, in a closing engagement with said plug seat means;
f) coupling means for releasably connecting said plug means to said first end portion of the valve stem, said coupling means including:
i) a thrust transmitting radial projection at an extreme of said first end portion, said projection being offset with respect to said valve axis and defining two axial face sections, one turned toward the intermediate portion, away from the stem;
ii) said projection being disposed in a complementary thrust chamber in the plug means such that the projection and the chamber are freely rotatable relative to one another, but are axially coupled with one another, the chamber being defined by a peripheral wall and by a pair of opposed end wall portions disposed each in a confronting relationship with the respective one of said axial face sections;
iii) said thrust chamber forming a portion of an axial opening in said plug means, the opening further including an inserting section communicating with said thrust chamber for allowing free inserting of the radially offset projection into the thrust chamber and removing same therefrom, in order to connect the stem to or disconnect it from the plug;
iv) centering means operatively associated with the stem and with the plug means for maintaining the stem and the plug in axial alignment when the projection is located in the thrust chamber;
v) said stem displacement means being adapted to displace the coupling means beyond said valve chamber to facilitate the replacement of the plug means.

In accordance with a particularly preferred embodiment, the centering means includes a centering pin having a first cylindric end portion and a second cylindric end portion, said first cylindric end portion being fixedly inserted in a centering bore in an end face of said first end portion of the stem, the second end portion of the centering pin being fixedly mounted in a hollow cylindric centering section of the plug means.

According to another preferred feature of the invention, the stem displacement means includes freely a pivotable securement of said second end portion of the stem to a thrust member mounted to said housing for a pivotal/axial displacement along said axis, whereby the pivotal/axial displacement of the thrust member causes axial, but not rotational displacement of said stem relative to the housing.

The invention will now be described in detail with reference to the accompanying simplified, diagrammatic drawings by way of two exemplary embodiments.

IN THE DRAWINGS

Figure 1:
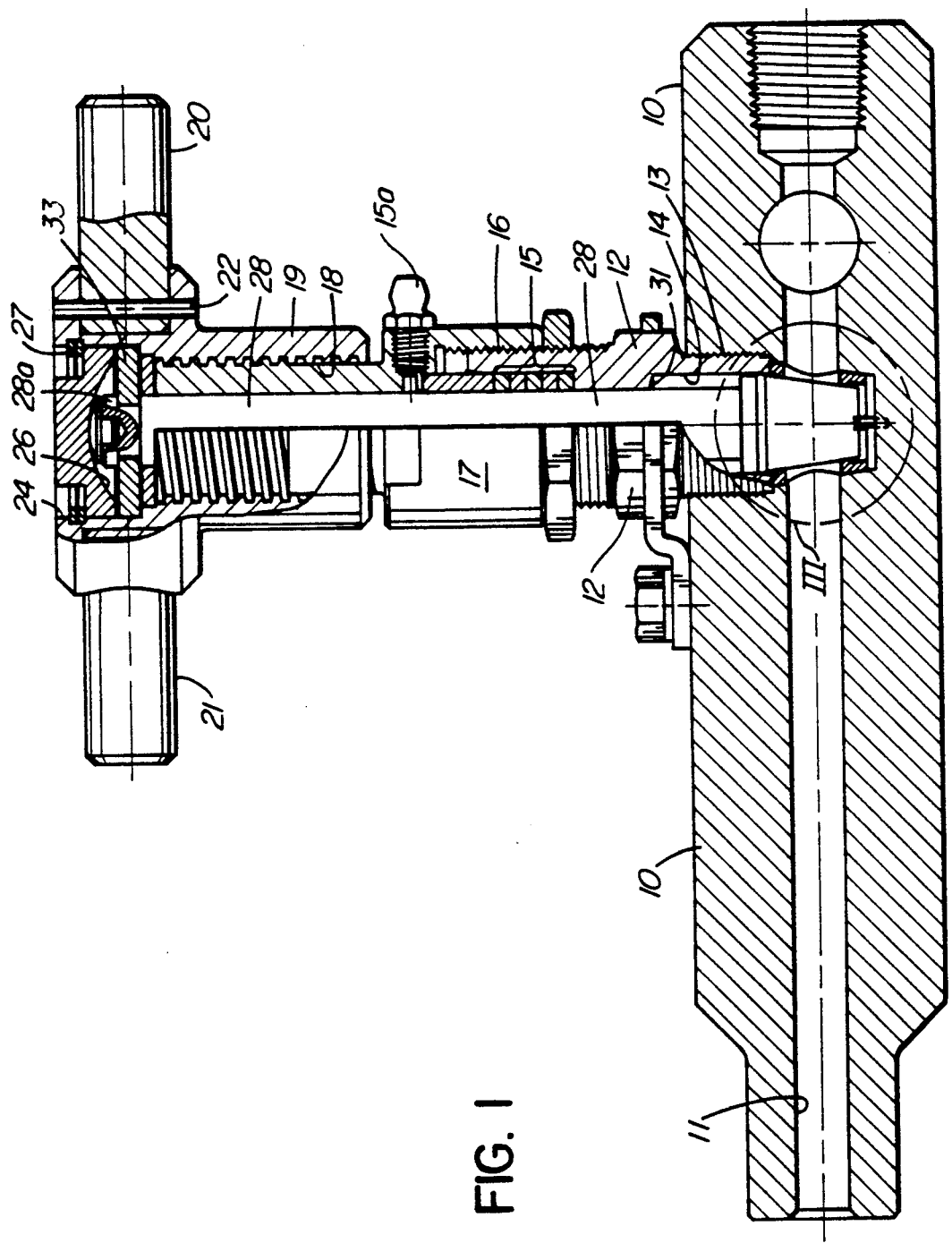
FIG. 1 is a diagrammatic sectional view of a first embodiment of the valve according to the present invention.

Turning firstly to FIG. 1, reference numeral 10 denotes a body having a fluid passage 11 therein. A bonnet 12 is threaded in a complementary threaded bore 13. The inside of the bonnet 12 defines a laterally inwardly directed, generally cylindrical valve chamber 14. The upper part of the bonnet houses a packing assembly 15 which is typically provided with a set of packing and wiping rings as is well known in the art. The upper part of the bonnet is threaded at 16 to receive a coaxial adjuster 17. The outer surface of the upper part of the adjuster 17 is threaded at 18. The thread 18 is complementary with the thread of a handle nut 19 which, in the embodiment shown, is provided with handle pins 20, 21 held in place by locking pins such as pin 22 mounted in the hub of the handle nut 19.

The inside of the hub of the handle nut 19 defines a cylindric cavity in which is disposed a horse-shoe thrust washer 23. The horse-shoe thrust washer 23 rests on an annular shoulder forming the bottom of the cylindric cavity 24. The top face of the thrust washer 23 is engaged with a top thrust washer 25, the lower central face of which defines a dome-shaped cavity 26. The assembly of the top thrust washer 26 and thrust washer 23 is held within the cylindrical cavity 24 by a snap ring 27.

The inside slot of the thrust washer 23 engages a peripheral groove disposed between a head 28a and the upper end of a generally cylindric intermediate portion 28 of a valve stem. The part which includes the top end of the intermediate portion 28, the groove engaged by the thrust washer 23 and the head 27, is also referred to hereinafter in general terms as "a second end portion" of the valve stem. The intermediate portion 28 extends through a housing which is formed, generally, by the adjuster 17 and the bonnet 12, through the packing assembly 15, and down to the valve chamber 14.

The clearance between the second end portion of the valve stem and the thrust washer 23 is such as to allow free rotation of the handle nut 19 relative to the valve stem 28.

Thus, the manipulation of the handle pins 21 and 20 results in the pivotal/axial displacement of the nut 19 relative to the housing 12, 17, but the valve stem 28 does not rotate and is only displaced axially relative to the housing 12, 17. This reduces substantially the distance travelled by the valve stem 28 relative to the packing assembly 15.

An injection nozzle 15a serves the purpose of injecting a sealant into the housing if leak is detected above the packing assembly 15.

Figure 3:
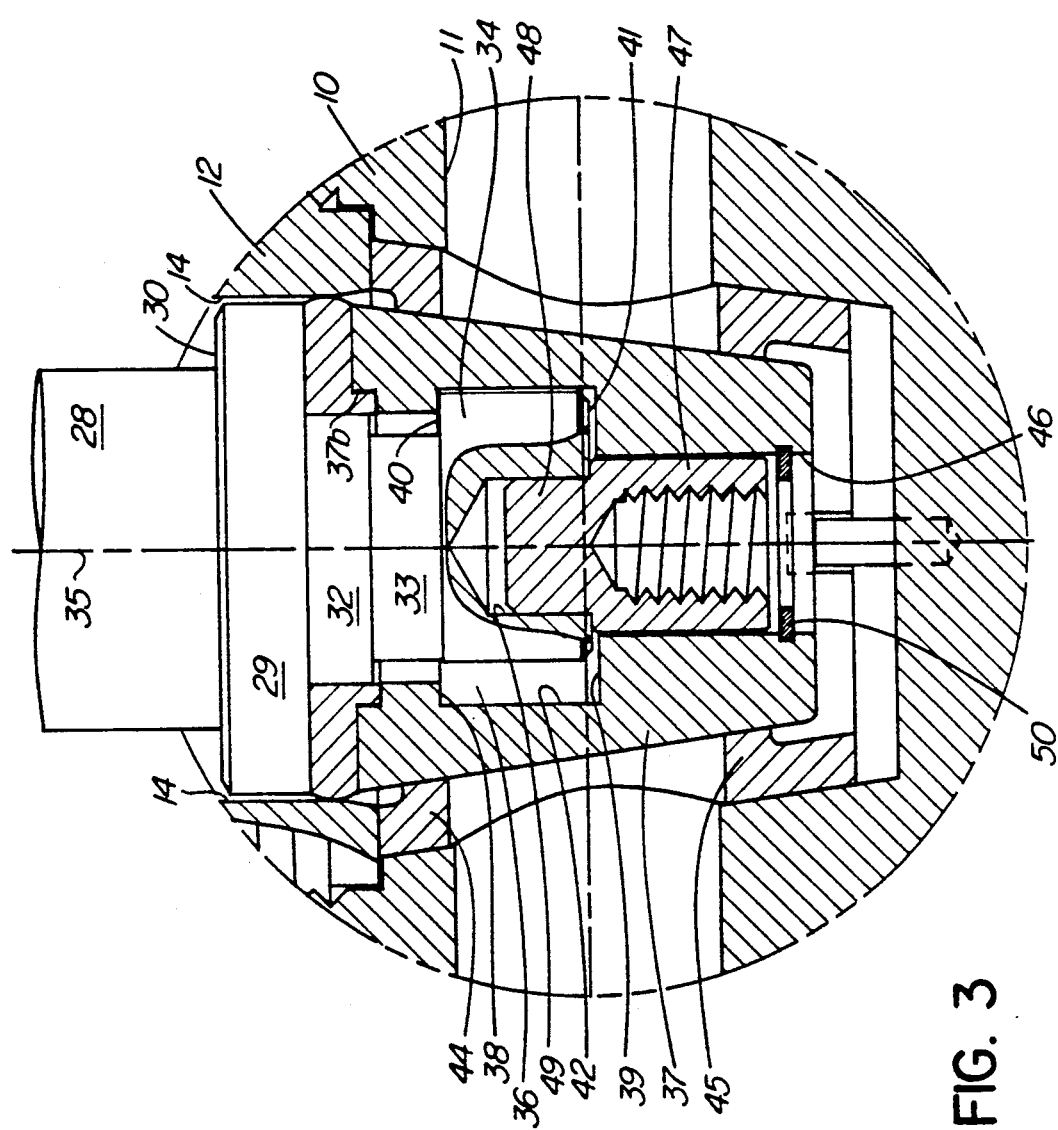
FIG. 3 is a cross sectional view of a detail III of FIG. 1 or FIG. 2.

The lower end of the valve stem is best shown in FIG. 3. It is also referred to as "a first end portion of the valve stem". The lower end of the intermediate portion 28 merges firstly with an enlarged diameter collar 29. The collar is integral with the intermediate portion 28 and forms an adjoining portion between the intermediate part 28 and the second end portion of the valve stem. The collar is normally disposed within the valve chamber 14. The top of the collar 29 defines an annular shoulder 30 which is complementary with an annular bottom 31 forming the upper limit of the valve chamber 14. The integral first end of the valve stem then continues by way of a short cylindric section 32, a reduced diameter section 33 and down to the radial projection 34. The radial projection 34 forms an important part of the present invention. It is preferred that the projection 34 have the shape of a cylindric portion which is eccentric with respect to the valve axis 35. The valve axis 35, of course, is at an angle to the axis of the passage 11.

The radial projection 34 is located at an extreme of the first end portion of the valve stem. It is disposed for a free movement within a thrust chamber 36 which is of the shape of a cylindric cavity within conical valve plug 37. The thrust chamber 36 has an upper end wall portion 38 and an opposed lower end wall portion 39. The two wall portions 38, 39 are confronted with an upper axial face 40 and a lower axial face 41 of the radial projection 34. A slight axial spacing is provided between the radial projection 34 and the end wall portions 38, 39. The peripheral wall 42 of the chamber 36 is cylindric and is concentric with the axis 35 to allow the movement of the projection 34 about the peripheral wall 42, when such motion is required, e.g. in the embodiment of FIG. 2, as will be described later. Of course, it also has size sufficient to allow free rotation of the radial projection 34 therein. The chamber 36 forms a part of an axial opening in the plug 37 which includes an inserting section 43. The inserting section 43, like chamber 36, forms a cylindric cavity concentric with the axis 35 and having a diameter which is larger than the diameter of the radial projection 34 but smaller than that of the peripheral wall 42. In other words, when the plug 37 is being coupled with the first end portion of the stem, the radial projection 34 can freely pass through the inserting section 43 into the thrust chamber 36. The plug 37 is complementary with plug seat means which is comprised of an upper seat 44 and a lower seat 45, both disposed in the body 10 as is well known in the art of plug valves.

The thrust chamber 36 and the inserting section 43 form a part of what is referred to as an axial opening in the plug 37. In the embodiment shown, the axial opening has the form of a central passage through the plug which is coaxial with the axis 35 and which includes, at the lower end, a cylindrical centering section 46. Within the centering section 46 is freely pivotable a cylindric, second end portion 47 of a centering pin. The upper first cylindric end portion 48 is pressed, at a slight overlap, in a centering bore 49 which is machined in the lower axial face 41 of the valve stem. The lower axial face 41, of course, forms an end face of the first end portion of the stem. A snap ring 50 is located just below the second end portion 47 of the centering pin.

Figure 2:
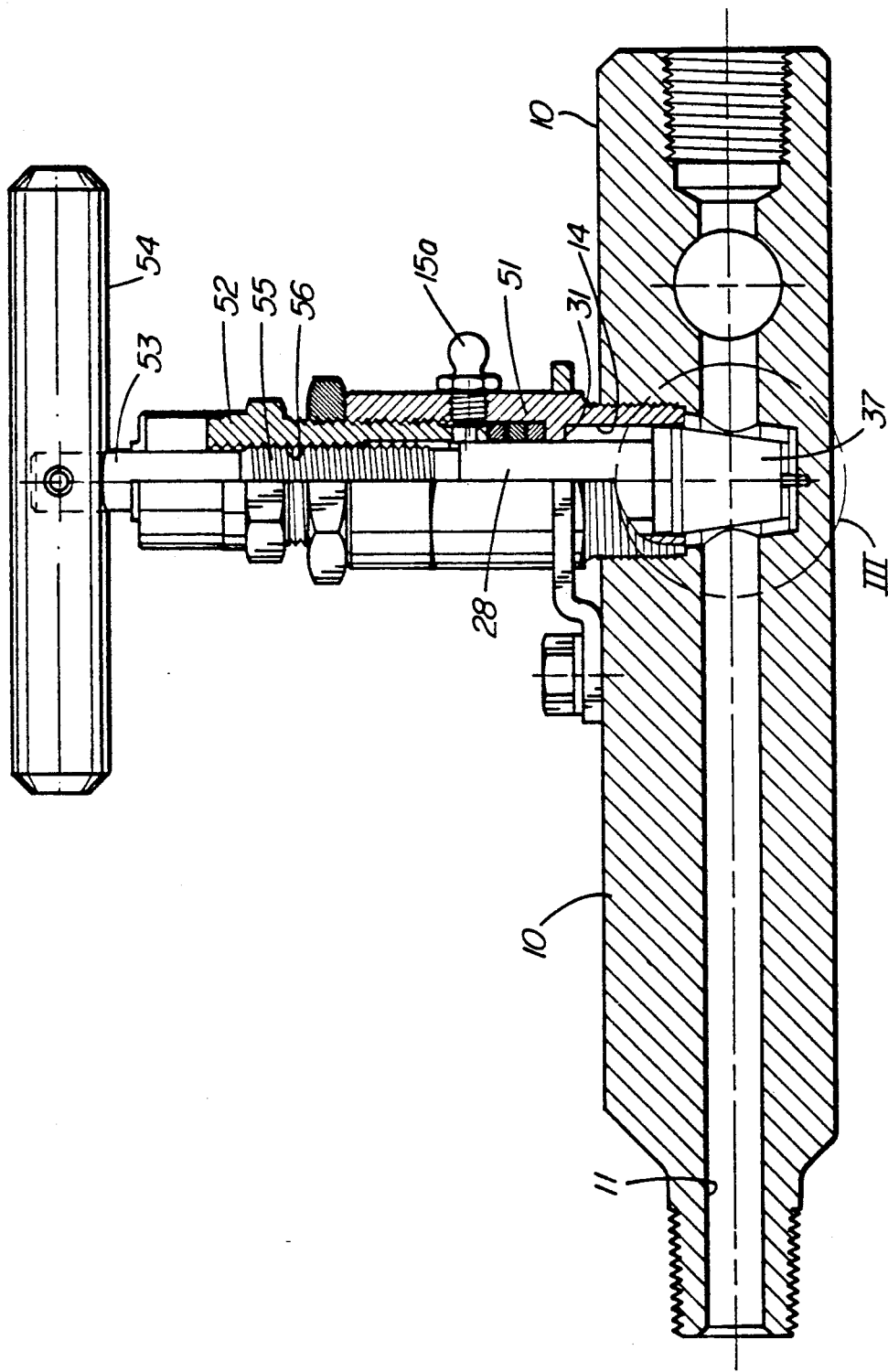
FIG. 2 is a similar cross sectional view but showing a second embodiment of the invention.

Reference may now be had to FIG. 2 which shows another embodiment of the present invention utilized in a plug valve which has a rotary stem.

Since most parts of the valve of FIG. 2 correspond in shape and in function to the arrangement of FIGS. 1 and 3 (and this is particularly the case of the arrangement shown in FIG. 3 of the plug coupling to the stem), they are not described in detail again. Whenever the parts of FIG. 2 referred to correspond exactly to those of FIG. 1, the same reference numeral is used.

In FIG. 2, the body 10 receives a bonnet 51 in which is threaded an adjuster 52. The bonnet 51 and adjuster 52 house a valve stem 53 to which is fixedly secured a handle 54. The intermediate part of the stem 53 is threaded at 55, the thread 55 being complementary with the inside thread 56 of the adjuster 52. The lower part of the intermediate part of the stem 53 is again cylindric and its lower part corresponds, for all practical purposes, to the intermediate portion 28. Therefore it is referred to in FIG. 2 with the same reference number.

It can be seen that, in FIG. 2, the turning of the handle 54 results in a pivotal/axial displacement of the stem. Such displacement is eventually transmitted to the plug 37 through the eccentric projection 34 (FIG. 3). Since there is a play between the projection 34 the walls of the chamber 36, at the outset of the opening motion, the rotation of the eccentric projection 34 is not transmitted to the rotation of the plug which is therefore displaced merely in axial direction.

On the other hand, in the embodiment of FIG. 1, the rotation of the handle 20, 21 is transmitted to the head 27 as described and does not result in any substantive rotation of the intermediate part 28 of the stem. Any tendency of the stem to rotate is hindered by the sealing engagement with the packing assembly 15.

Thus, the thrust is transmitted from the stem to the plug through the projection 34, by the assistance of the means maintaining the plug 37 aligned with axis 35 and including the centering pin and the plug thrust washer 37a which engages, at its inside, the cylindric section 32 and, at its downward end, a shallow cylindric chamber 37b to maintain coaxial arrangement with the axis 35 while allowing relative rotation of the plug 37 and the stem.

Assuming now that it is desired to replace the plug 37, it is sufficient to remove the bonnet (and with it the entire valve from the body 10). Thereupon, the stem 28 is brought to its extreme downward position. After removal of the snap ring 50, the centering pin 47 and 48 is pulled out of the bottom face of the stem by a suitable tool engaged in the inner thread shown in FIG. 3. The subsequent manipulation of the handle 20, 21 or 54 brings the plug downwardly outside of the chamber 14. The plug can now be simply displaced sideways such as to align the projection 34 with the inserting section 43. The plug is then free to be moved and by a reversed operation a new or corrected plug secured back to the stem.

An important advantage of the present invention will be appreciated when one realizes that, in a fully raised position, the stem brings the shoulder 30 of the collar 29 into a sealing abutment with the bottom 31 of the chamber 14. In such position, the pressurized medium in conduit 11 has no way of flowing toward the area of the packing assembly 15. By the same token, the centering bore 49 terminating at the point of merger between the projection 34 and the reduced diameter section 33 does not allow passage of the pressurized medium through the inside of the stem. In other words, in a fully open state, there is virtually no practical way for the pressurized medium to stress the packing assembly 15 or to otherwise cause problems with leakage through the valve assembly.

While the present invention has been described by way of two preferred embodiments, of which the one of FIG. 1 is particularly preferred due to the lack of rotation of the stem, it will be appreciated by those skilled in the art that the inventive idea can be carried out by many other embodiments differing to a greater or lesser degree from those disclosed.

Accordingly, we wish to protect by letters patent which may issue on the present application all such embodiments as properly and fairly fall within the scope of our contribution to the art.

I claim:
1. A valve comprising, in combination:
 a) a body which has a longitudinally disposed fluid passage, and a laterally inwardly directed, generally cylindrical valve chamber coaxial with a valve axis, said valve chamber reaching into said passage and defining therein hollow, conical plug seat means, coaxial with said axis;
 b) conical plug means complementary with said seat means and disposed in said valve chamber coaxially therewith;
 c) said plug means being rotatably secured to a first end portion of a valve stem for axial displacement in common therewith, said stem being coaxial with said axis and further including an elongate, cylindric intermediate portion and a second end portion;
 d) said stem being mounted in a housing fixedly secured to the body and sealingly communicating with said valve chamber;
 e) stem displacement means operatively associated with the stem and with the housing for selective displacement of the stem relative to the housing to displace the plug means in and out of the housing, in a closing engagement with said means;
 f) coupling means for releasably connecting said plug means to said first end portion of the valve stem, said coupling means including:
  i) a thrust transmitting radial projection at an extreme of said first end portion, said projection being offset with respect to said valve axis and defining two axial face sections,
  ii) said projection being disposed in a complementary thrust chamber in the plug means such that the projection and the chamber are freely rotatable relative to one another, but are axially coupled with one another, the chamber being defined by a peripheral wall and by a pair of opposed end wall portions disposed each in a confronting relationship with the respective one of said axial face sections;
  iii) said thrust chamber forming a portion of an axial opening in said plug means, the opening further including an inserting section communicating with said thrust chamber for allowing free passage of the radially offset projection into the thrust chamber and removing same therefrom, in order to connect the stem to or disconnect it from the plug;
  iv) centering means operatively associated with the stem and with the plug means for maintaining a receiving means within said projection and a centering portion of the axial opening of the plug in axial alignment when during displacement of the plug means the projection is located in the thrust chamber;
  v) said stem displacement means being adapted to displace the coupling means beyond said valve chamber to facilitate the replacement of the plug means.

2. The valve of claim 1, wherein said centering means includes a centering pin having a first cylindric end portion and a second cylindric end portion, said first cylindric end portion being fixedly inserted in a centering bore in an end face of said first end portion of the stem, the second end portion of the centering pin being freely pivotable in a hollow cylindric centering section of the plug means.

3. The valve of claim 2, wherein the peripheral wall of said chamber is symmetrical with respect to said axis.

4. The valve of claim 3, wherein the inserting section and the thrust chamber are cylindrical cavities communicating with one another, the diameter of the inserting section being smaller than that of the thrust chamber.

5. The valve of claim 4, wherein the projection is an eccentric cylindrical section of the first end portion, offset relative to said axis, the diameter of the projection being smaller than that of the inserting section, to allow free passage of the projection through the inserting section when the plug is being removed from or mounted on the stem.

6. The valve of claim 5, wherein the centering bore is a blind bore terminating at a point near said inserting section, the rest of the stem being solid, whereby pressurized medium is prevented from penetrating from said fluid passage into the stem beyond said first end portion.

7. The valve of claim 6, wherein the second end portion further includes a collar integral with the stem and forming a adjoining portion with said cylindric intermediate portion, said collar being disposed within a part of the valve chamber located in a bonnet section of said housing, said part of the valve chamber having an annular bottom portion complementary with said collar to abut the collar against the annular bottom section when the stem is in a fully raised position, to block passage of pressurized fluid from said part of the valve chamber by said intermediate portion to a packing assembly of the valve.

8. The valve of claim 1, wherein said stem displacement means includes freely a pivotable securement of said second end portion of the stem to a thrust member mounted to said housing for a pivotal/axial displacement along said axis, whereby the pivotal/axial displacement of the thrust member causes axial, but not rotational displacement of said stem relative to the housing.

* * * * *